United States Patent
Hutchinson et al.

(10) Patent No.: US 9,172,471 B2
(45) Date of Patent: Oct. 27, 2015

(54) SYSTEM AND METHOD FOR SUPPRESSION OF EVEN-ORDER PHOTODIODE DISTORTIONS

(71) Applicants: Meredith N. Hutchinson, Washington, DC (US); Joseph M. Singley, Elysburg, PA (US); Vincent J Urick, Alexandria, VA (US); Jason D. McKinney, Bowie, MD (US); Keith J Williams, Dunkirk, MD (US)

(72) Inventors: Meredith N. Hutchinson, Washington, DC (US); Joseph M. Singley, Elysburg, PA (US); Vincent J Urick, Alexandria, VA (US); Jason D. McKinney, Bowie, MD (US); Keith J Williams, Dunkirk, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 38 days.

(21) Appl. No.: 14/045,618

(22) Filed: Oct. 3, 2013

(65) Prior Publication Data
US 2014/0270807 A1    Sep. 18, 2014

Related U.S. Application Data

(60) Provisional application No. 61/787,392, filed on Mar. 15, 2013.

(51) Int. Cl.
| | |
|---|---|
| *H04B 10/04* | (2006.01) |
| *H04B 10/548* | (2013.01) |
| *H04B 10/532* | (2013.01) |
| *H04B 10/2507* | (2013.01) |
| *H04B 10/2575* | (2013.01) |

(52) U.S. Cl.
CPC .......... *H04B 10/548* (2013.01); *H04B 10/2507* (2013.01); *H04B 10/2575* (2013.01); *H04B 10/532* (2013.01); *H04B 2210/254* (2013.01)

(58) Field of Classification Search
CPC .......... H04B 10/2507; H04B 10/2575; H04B 10/532; H04B 10/548; H04B 2210/254
USPC .......................................................... 398/152
See application file for complete search history.

(56) References Cited

U.S. PATENT DOCUMENTS

| | | | |
|---|---|---|---|
| 5,161,044 A * | 11/1992 | Nazarathy et al. ............ | 398/194 |
| 5,369,522 A | 11/1994 | Tangonan et al. | |
| 5,406,588 A | 4/1995 | Birchler et al. | |
| 5,850,305 A * | 12/1998 | Pidgeon ........................ | 398/193 |
| 6,392,779 B1 * | 5/2002 | Iannelli et al. ................ | 359/245 |
| 6,583,906 B1 * | 6/2003 | Schemmann et al. ........ | 398/158 |
| 6,634,811 B1 | 10/2003 | Gertel et al. | |

(Continued)

*Primary Examiner* — Ken Vanderpuye
*Assistant Examiner* — Amritbir Sandhu
(74) *Attorney, Agent, or Firm* — US Naval Research Laboratory; L. George Legg

(57) ABSTRACT

A system for suppressing even-order distortion in a photonic link includes a laser for providing laser light to a first input of a Mach-Zehnder modulator (MZM), where the MZM has a second input for receiving an RF input signal, a third input for applying a DC bias voltage to the MZM, and an optical signal output. A dc-voltage-biased photodiode has an input, coupled to the MZM optical signal output, and a modulated RF signal output. The MZM DC bias voltage is set at a value to generate an even-order distortion amplitude substantially equal to an even-order distortion amplitude from the photodiode and 180 degrees out of phase so as to substantially cancel the photodiode even-order distortion. The invention provides the cancellation of photodiode even-order distortion via predisortion linearization with a MZM biased slightly away from quadrature, employing a single fiber run and a single photodiode. The invention provides an improvement in carrier-to-intermodulation ratio (CIR) upwards of 40 dB.

4 Claims, 10 Drawing Sheets

(56) References Cited

U.S. PATENT DOCUMENTS

| | | | |
|---|---|---|---|
| 6,917,764 B1* | 7/2005 | Wilson | 398/193 |
| 7,079,780 B1* | 7/2006 | Rollins | 398/198 |
| 7,382,985 B2 | 6/2008 | Roberts et al. | |
| 8,032,025 B2* | 10/2011 | Ibragimov et al. | 398/65 |
| 8,059,969 B1 | 11/2011 | Yap | |
| 8,693,875 B2 | 4/2014 | Banwell et al. | |
| 2001/0005437 A1* | 6/2001 | Masuda et al. | 385/2 |
| 2002/0196508 A1* | 12/2002 | Wei et al. | 359/183 |
| 2005/0047780 A1* | 3/2005 | Hoshida et al. | 398/33 |
| 2007/0041735 A1* | 2/2007 | Darcie et al. | 398/186 |
| 2007/0047954 A1* | 3/2007 | Mamyshev | 398/33 |
| 2007/0064945 A1* | 3/2007 | Yuan et al. | 380/263 |
| 2008/0094123 A1* | 4/2008 | Koh et al. | 327/513 |
| 2009/0263144 A1* | 10/2009 | McKinney | 398/214 |
| 2010/0166423 A1* | 7/2010 | Chang et al. | 398/65 |
| 2010/0266289 A1* | 10/2010 | Devgan et al. | 398/147 |
| 2011/0158576 A1* | 6/2011 | Kissa et al. | 385/3 |
| 2011/0222813 A1* | 9/2011 | Webster et al. | 385/3 |
| 2013/0028610 A1* | 1/2013 | DeSalvo et al. | 398/139 |
| 2013/0259485 A1* | 10/2013 | Wang | 398/115 |

* cited by examiner

SYSTEM AND METHOD FOR SUPPRESSION OF EVEN-ORDER PHOTODIODE DISTORTIONS

CROSS-REFERENCE TO RELATED APPLICATIONS

This application claims the benefit of U.S. Provisional Application 61/787,392 filed on Mar. 15, 2013 and incorporated herein by reference.

FIELD OF THE INVENTION

The invention is directed to a high-linearity photonic link, and in particular to a photonic link having an improved even-order distortion response.

BACKGROUND OF THE INVENTION

High-linearity photodiodes are actively researched in the field of microwave photonics, with applications in the academic, industrial and military sectors. A recent survey collects reported state-of-the-art results from the component level (V. J. Urick, J. F. Diehl, M. N. Draa, J. D. McKinney, and K. J. Williams, "Wideband analog photonic links: some performance limits and considerations for multi-octave limitations," Proc. SPIE 8259, 1-14 (2012) ("Urick et al. 1"). The concentration of high-linearity photodiode work is largely in terms of single-octave third-order-limited intermodulation distortion as quantified by a third-order output intercept point (OIP3). One of the inherent advantages of photonic solutions is the wide bandwidth available in the optical domain, making analog optical links attractive for multi-octave applications. However, even-order distortion generated by photodiodes can be inhibiting in such implementations as described in Urick et al. Previous works, e.g. Urick et al. 1 and V. J. Urick, A. S. Hastings, J. D. McKinney, P. S. Devgan, K. J. Williams, C. Sunderman, J. F. Diehl, and K. Colladay, "Photodiode linearity requirements for radio-frequency photonics and demonstration of increased performance using photodiode arrays," in 2008 *IEEE International Meeting on Microwave Photonics Digest*, pp. 86-89 ("Urick et al. 2"), have described the photodiode requirements in high-linearity photonic links for single- and multi-octave applications in terms of OIP3 and second-order output intercept point (OIP2), respectively. Oftentimes the present photodiode technology falls short of the system requirements, particularly in multi-octave applications. Architectural techniques have been devised to mitigate the component limitations. For example, photodiode arrays have been shown to achieve better linearity than the individual photodiodes are capable of alone. Two- and four-photodiode arrays have been demonstrated (see, respectively, A. Joshi, "Highly linear dual photodiodes for Ku-Band applications," in 2009 *IEEE Avionics Fiber Optics and Photonics Conference Digest*, pp. 9-10, and Y. Fu, H. Pan, and J. C. Campbell, "Photodiodes with monolithically integrated Wilkinson power combiner," IEEE J. Quantum Electron. 46, 541-545 (2010); and S. Itakura, K. Sakai, T. Nagatsuka, E. Ishimura, M. Nakaji, H. Otsuka, K. Mori, and Y. Hirano, "High-current backside-illuminated photodiode array module for optical analog links," J. Lightwave Technol. 28, 965-971 (2010) and Y. Fu, H. Pan, Z. Li, and J. Campbell, "High linearity photodiode array with monolithically integrated Wilkinson power combiner," in 2010 *IEEE International Meeting on Microwave Photonics Digest*, pp. 111-113). This simple but quite effective technique is based on dividing the input signal between numerous non-linear devices and then linearly combining their outputs. The "array gain" scales with the number of elements for both even- and odd-order distortion, assuming that each element exhibits the same nonlinearity. Balanced photodiode arrays have been demonstrated that improve the OIP3 by the array gain but suppress photodiode-generated even-order distortion through the balanced detection process (Urick et al. 2, and A. S. Hastings, V. J. Urick, C. Sunderman, J. F. Diehl, J. D. McKinney, D. A. Tulchinsky, P. S. Devgan, and K. J. Williams, "Suppression of even-order photodiode nonlinearities in multioctave photonic links," J. Lightwave Technol. 26, 2557-2562 (2008). This technique is attractive for multi-octave applications but requires two phase-matched fibers for the transmission span when implemented with a Mach-Zehnder modulator (MZM).

BRIEF SUMMARY OF THE INVENTION

According to the invention, a system for suppressing even-order distortion in a photonic link includes a laser for providing laser light to a first input of a Mach-Zehnder modulator (MZM), where the MZM has a second input for receiving an RF input signal, a third input for applying a DC bias voltage to the MZM, and an optical signal output. A dc-voltage-biased photodiode has an input, coupled to the MZM optical signal output, and a modulated RF signal output. The MZM DC bias voltage is set at a value to generate an even-order distortion amplitude substantially equal to an even-order distortion amplitude from the photodiode and 180 degrees out of phase so as to substantially cancel the photodiode even-order distortion.

The invention provides the cancellation of photodiode even-order distortion via predisortion linearization with a MZM biased slightly away from quadrature, employing a single fiber run and a single photodiode. The invention provides an improvement in carrier-to-intermodulation ratio (CIR) upwards of 40 dB.

DETAILED DESCRIPTION OF THE INVENTION

Figure 1:
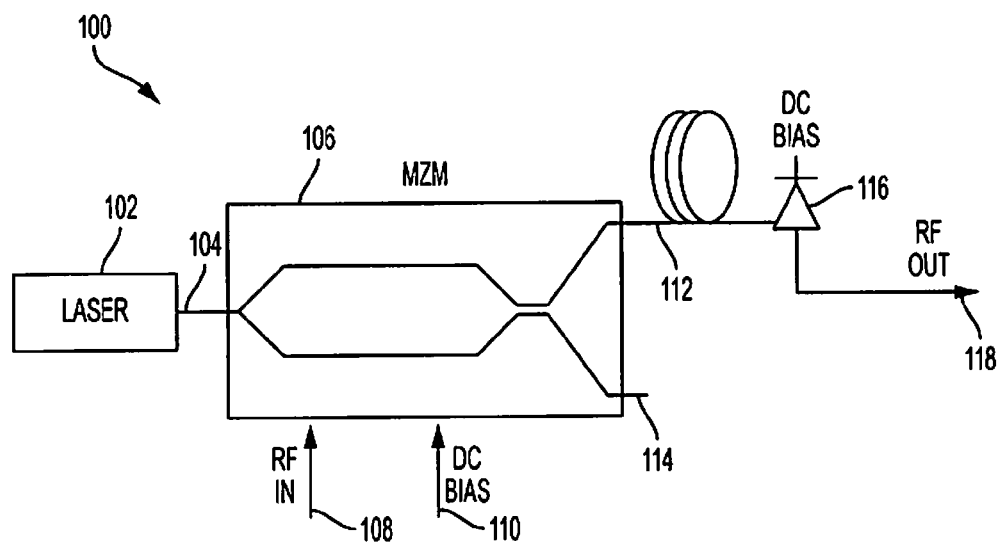
FIG. 1 is a schematic diagram of an intensity-modulation direct-detection link employing an external Mach-Zehnder Modulator (MZM) according to the invention.

A calculation demonstrating cancellation of photodiode even-order distortion with MZM-generated distortion is conducted assuming the architecture of the invention 100 shown in FIG. 1. A laser light source 102 outputs a laser light to a first input 104 of a Mach-Zehnder modulator (MZM) 106 having an RF signal input 108 and an input 110 for applying an adjustable DC bias voltage. MZM 106 generates an output optical signal 112 (a second MZM output 114 is coupled to an optical power meter, not illustrated, in order to monitor and adjust the DC bias voltage applied to the MZM 106) that is input to a dc-voltage-biased photodiode 116 that is biased at a selected level to generate an RF output signal 118 with photodiode-induced even-order distortion substantially cancelled. The bias voltage of the MZM 106 is adjusted so that the second-order MZM distortion matches the amplitude of the photodiode second-order distortion, which under certain conditions are out of phase with each other. The following analysis is conducted in three steps. First, the response for the intensity-modulation direct-detection (IMDD) link in FIG. 1 is reviewed and cast in well-known closed-form expressions assuming an ideal linear photodiode. A Taylor series analysis is then employed to model the photodiode nonlinearity. Finally, these two sets of equations are combined to predict the composite response.

Link with Ideal Photodiode

The response for an IMDD link employing a MZM is well-known (see B. H. Kolner and D. W. Dolfi, "Intermodulation distortion and compression in an integrated electrooptic modulator," Appl. Opt. 26, 3676-3680 (1987)). Here, the terms relevant to the cancellation technique are highlighted. We assume an ideal push-pull MZM with the following transfer function:

$$\begin{bmatrix} E_1(t) \\ E_2(t) \end{bmatrix} = \frac{1}{2} \begin{bmatrix} 1 & i \\ i & 1 \end{bmatrix} \begin{bmatrix} e^{i\phi(t)/2} & 0 \\ 0 & e^{-i\phi(t)/2} \end{bmatrix} \begin{bmatrix} 1 & i \\ i & 1 \end{bmatrix} \begin{bmatrix} E_{in}(t) \\ 0 \end{bmatrix}, \quad (1)$$

where $E_1$ and $E_2$ are the fields corresponding to the two MZM outputs, $\phi$ is the phase shift induced by the applied voltage, and $E_{in}$ is the field at the MZM input. The frequency-dependent MZM half-wave voltage is $V_\pi(\Omega)$. The input field is written as $E_{in} = \kappa\sqrt{2P_o}e^{i\omega t}$, where $P_o$ is the average optical power at angular frequency $\omega$ and $\kappa$ is a constant such that $P_o = E^*E/(2\kappa^2)$. The input to the MZM comprises a DC bias voltage $V_{dc}$ and a two-tone RF signal of the form $V_1 \sin(\Omega_1 t) + V_2 \sin(\Omega_2 t)$, where $\Omega$ are the angular frequencies. With these input voltages the phase shift $\phi(t) = \phi_{dc} + \phi_1 \sin(\Omega_1 t) + \phi_2 \sin(\Omega_2 t)$ results, where $\phi_{dc} = \pi V_{dc}/V_\pi$ and $\phi_{1,2} = \pi V_{1,2}/V_\pi$. Assuming an ideal photodiode with responsivity $\Re$, the total photocurrent due to $E_1$ can be calculated and separated into three components:

$$I_{dc,mzm} = I_{dc,q} - I_{dc,q}J_0(\phi_1)J_0(\phi_2)\cos(\phi_{dc}) \quad (2a)$$

$$I_{odd,mzm} = 2\sin(\phi_{dc})I_{dc,q} \times \left\{ J_0(\phi_2)\sum_{j=0}^{\infty} J_{2j+1}(\phi_1)\sin[(2j+1)\Omega_1 t] + \right. \quad (2b)$$

$$J_0(\phi_1)\sum_{k=0}^{\infty} J_{2k+1}(\phi_2)\sin[(2k+1)\Omega_2 t] -$$

$$\sum_{j=0}^{\infty}\sum_{m=1}^{\infty} J_{2j+1}(\phi_1)J_{2m}(\phi_2)\sin[(2m\Omega_2 - (2j+1)\Omega_1)t] -$$

$$\sum_{k=0}^{\infty}\sum_{h=1}^{\infty} J_{2k+1}(\phi_2)J_{2h}(\phi_1)\sin[(2h\Omega_1 - (2k+1)\Omega_2)t] +$$

$$\sum_{j=0}^{\infty}\sum_{m=1}^{\infty} J_{2j+1}(\phi_1)J_{2m}(\phi_2)\sin[(2m\Omega_2 + (2j+1)\Omega_1)t] +$$

$$\left. \sum_{k=0}^{\infty}\sum_{h=1}^{\infty} J_{2k+1}(\phi_2)J_{2h}(\phi_1)\sin[(2h\Omega_1 + (2k+1)\Omega_2)t] \right\}$$

$$I_{even,mzm} = 2\cos(\phi_{dc})I_{dc,q} \times \quad (2c)$$

$$\left\{ -J_0(\phi_2)\sum_{k=1}^{\infty} J_{2k}(\phi_1)\cos(2k\Omega_1 t) - J_0(\phi_1)\sum_{m=1}^{\infty} J_{2m}(\phi_2)\cos(2m\Omega_2 t) + \right.$$

$$\sum_{n=0}^{\infty}\sum_{p=0}^{\infty} J_{2n+1}(\phi_1)J_{2p+1}(\phi_2)\cos[((2p+1)\Omega_2 - (2n+1)\Omega_1)t] -$$

$$\sum_{n=0}^{\infty}\sum_{p=0}^{\infty} J_{2n+1}(\phi_1)J_{2p+1}(\phi_2)\cos[((2p+1)\Omega_2 + (2n+1)\Omega_1)t] -$$

$$\sum_{k=1}^{\infty}\sum_{m=1}^{\infty} J_{2k}(\phi_1)J_{2m}(\phi_2)\cos[2(m\Omega_2 - k\Omega_1)t] -$$

$$\left. \sum_{k=1}^{\infty}\sum_{m=1}^{\infty} J_{2k}(\phi_1)J_{2m}(\phi_2)\cos[2(m\Omega_2 + k\Omega_1)t] \right\}$$

where $I_{dc,q}$ is the photocurrent at quadrature and J is a Bessel function of the first kind. The quadrature condition is given by $\phi_{dc} = (2k+1)\pi/2$ where k is an integer. Equation (2a) is the average (DC) current, Eq. (2b) are the odd-order RF terms, and Eq. (2c) are the even-order RF terms. Thus, the total photocurrent for this output is $I_1(t) = I_{dc,mzm} + I_{odd,mzm} + I_{even,mzm}$. The photocurrent associated with $E_2$ is $I_2(t) = 2I_{dc,q} - I_1(t)$. The treatment here will assume a small-signal two-tone test with equal amplitude tones, thus $\phi_1 = \phi_2 = \phi \ll 1$. A small-signal approximation allows for the Bessel functions to be written as $J_n(\phi) \approx \phi^n/(2^n n!)$. These conditions can be applied to Eq. (2) to yield the fundamental photocurrents $$I_{fund,mzm} = \phi I_{dc,q} \sin(\phi_{dc})[\sin(\Omega_1 t) + \sin(\Omega_2 t)] \quad (3)$$

Assuming all of the current is delivered to a load with resistance R, the average output power for both the fundamentals is $P_{fund,mzm} = \phi^2 I_{dc,q}^2 \sin^2(\phi_{dc})R/2$. The work here concentrates on even-order distortion. The largest small-signal distortion in Eq. (2) is second-order intermodulation distortion (IMD2) at frequencies $|f_1 \pm f_2|$ given by the first two double summations in Eq. (2c) with n=p=0. The small-signal photocurrent for these two terms is $$I_{imd2,mzm} = \pm \frac{\phi^2 I_{dc,q} \cos(\phi_{dc})}{2} \cos[(\Omega_2 \mp \Omega_{11})t]. \quad (4)$$

The average power associated with Eq. (4) is $P_{imd2,mzm} = \phi^4 I_{dc,q}^2 \cos^2(\phi_{dc}) R/8$. Finally, the OIP2 due to MZM-generated IMD2 is $$OIP2_{mzm} = \frac{2\sin^4(\phi_{dc})}{\cos^2(\phi_{dc})} I_{dc,q}^2 R. \quad (5)$$

As given by Eq. (5) and detailed previously in Urick et al. 1, small deviations from quadrature bias can significantly degrade the OIP2. In fact, the tolerance on MZM bias can be quite stringent to maintain third-order-limited performance in multi-octave links.

Photodiode Distortion

Numerous models have been developed to describe photodiode distortions in microwave photonics applications (see K. J. Williams and R. D. Esman, "Design considerations for high-current photodetectors," J. Lightwave Technol. 17, 1443-1454 (1999), and Y. Fu, H. Pan, Z. Li, A. Beling, and J. C. Campbell, "Characterizing and modeling nonlinear intermodulation distortions in modified uni-traveling carrier photodiodes," IEEE J. Quantum Electron. 47, 1312-1319 (2011)). Here, we assume that the fundamentals from the MZM drive the photodiode, which can be described by a Taylor series expansion. We apply the following definition for a Taylor series expansion $$I_{pd} = a_0 + a_1(I_{in}-I_{dc}) + a_2(I_{in}-I_{dc})^2 + a_3(I_{in}-I_{dc})^3 + \ldots \quad (6)$$

where $I_{pd}$ is the output current of the photodiode with an injection current of $I_{in}$ and an average current $I_{dc}$. The Taylor coefficients are defined as usual $$a_m = \frac{1}{m!} \cdot \frac{d^m I_{pd}}{dI_{in}^m}\bigg|_{I_{in}=I_{dc}}. \quad (7)$$

Now, if we assume that $I_{in}=I_{fund,mzm}$ as given by Eq. (3), that is, the ideal IMDD link provides the injection current to a nonlinear photodiode described by Eq. (6), then $$I_{pd} = (a_0 + a_2 I^2) + a_1 I \sin(\Omega_1 t) + a_1 I \sin(\Omega_2 t) - \frac{a_2 I^2}{2}\cos(2\Omega_1 t) - \frac{a_2 I^2}{2}\cos(2\Omega_2 t) + a_2 I^2 \cos[(\Omega_1-\Omega_2)t] - a_2 I^2 \cos[(\Omega_1+\Omega_2)t] + \ldots \quad (8)$$

where $I = \phi I_{dc,q} \sin(\phi_{dc})$ and the expansion has been carried out to terms of second order. The currents for the IMD2 terms in Eq. (8) are $$I_{imd2,pd} = \pm a_2 \phi^2 I_{dc,q}^2 \sin^2(\phi_{dc}) \cos[(\Omega_2 \mp \Omega_1)t] \quad (9)$$

The OIP2 for the photodiode can be determined by the expression $OIP2_{pd} = P_{fund,pd}^2 / P_{imd2,pd}$, where $P_{fund,pd} = a_1^2 I^2 R/2$ and $P_{imd2,pd} = a_2^2 I^4 R/2$ are the average powers for the fundamental and IMD2, respectively. Thus, $$OIP2_{pd} = \frac{a_1^4 R}{2a_2^2}. \quad (10)$$

Combined Response

Our proposition is that the MZM biased can be adjusted to generate even-order distortion matching the amplitude of that arising from the photodiode. The forms of Eqs. (4) and (9) predict that two sources of distortion can be out of phase as well. The treatments of MZM- and photodiode-generated distortion above can be combined to derive the cancellation condition. The peak current at both IMD2 terms is obtained by addition of Eqs. (4) and (9):

$$I_{imd2,peak} = \pm \phi^2 I_{dc,q} \left[ \frac{\cos(\phi_{dc})}{2} + a_2 I_{dc,q} \sin^2(\phi_{dc}) \right], \quad (11)$$

where the "+" and "−" signs correspond to the terms at $(\Omega_2-\Omega_1)$ and $(\Omega_2+\Omega_1)$, respectively. Setting Eq. (11) to zero yields the cancellation condition as $$\frac{\cos(\phi_{dc})}{\sin^2(\phi_{dc})} = -2a_2 I_{dc,q}. \quad (12)$$

The analysis above also predicts that second-harmonic distortion will cancel as well; expanding the Taylor series to higher order shows that all even-order distortion is suppressed with this technique. The parameters in Eq. (12) are readily determined. The bias phase and photocurrent at quadrature are easily measured. The small-signal gain of the link will allow for the magnitude of $a_1$ to be calculated. With this information, a measurement of the photodiode OIP2 will give the magnitude for $a_2$ by way of Eq. (10). Cancellation of the IMD2 is then predicted by Eq. (12) to be cyclic as a function of $\phi_{dc}$.

Figure 2:
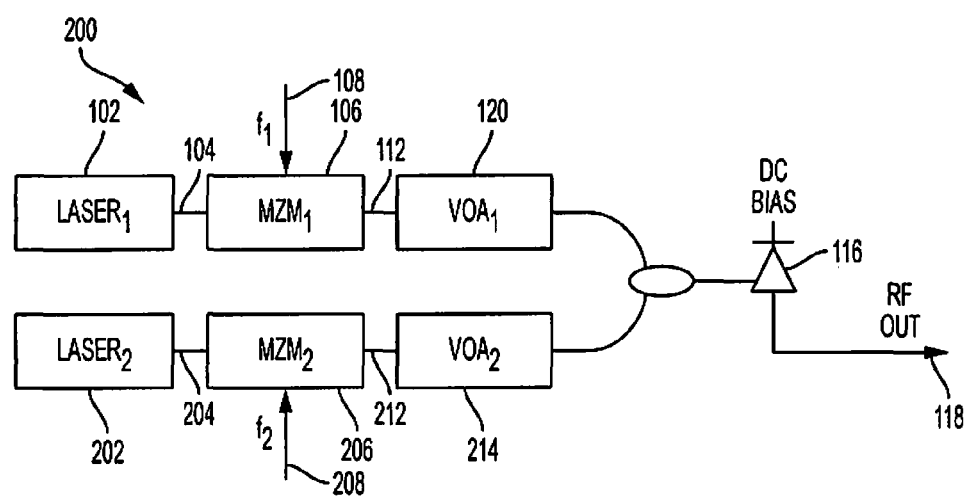
FIG. 2 is a schematic diagram of an apparatus for characterization of photodiode linearity, where two lasers are both intensity modulated via an external Mach-Zehnder modulator (MZM)

The experimental investigation involves two apparatuses, a single-MZM link 100 (FIG. 1) to demonstrate the cancellation and a two-MZM setup to isolate photodiode IMD2 200. The two-MZM setup 200 is shown in FIG. 2. Two lasers 102 and 202 respectively at different wavelengths output laser lights 104 and 204 that are respectively modulated via two quadrature-biased MZMs 106 and 206 each having a respective RF signal input 108 and 208. The RF signal generator power is adjusted to yield the same modulation depth on each laser. Variable optical attenuators (VOAs) 120 and 214 are then employed to equalize the average optical power from each MZM output 112 and 212 before coupling the two channels onto the photodiode 116 being evaluated to generate the RF output signal 118. If the two lasers are spaced at a frequency difference much larger than the modulation frequencies, then the IMD2 from the apparatus should be dominated by the photodiode nonlinearity. As compared to three-tone architectures employing three of more MZMs for odd-order distortion measurements (see A. Ramaswamy, N. Numoya, K. J. Williams, J. Klamkin, M. Piels, L. A. Johansson, A. S. Hastings, L. A. Coldren, and J. E. Bowers, "Measurement of intermodulation distortion in high-linearity photodiodes," Opt. Exp. 18, 2317-2324 (2010), and M. N. Draa, A. S. Hastings, and K. J. Williams, "Comparison of photodiode nonlinearity measurement systems," Opt. Exp. 19, 12635-12645 (2011)), this relatively simple two-tone setup is adequate for IMD2.

Figure 3:
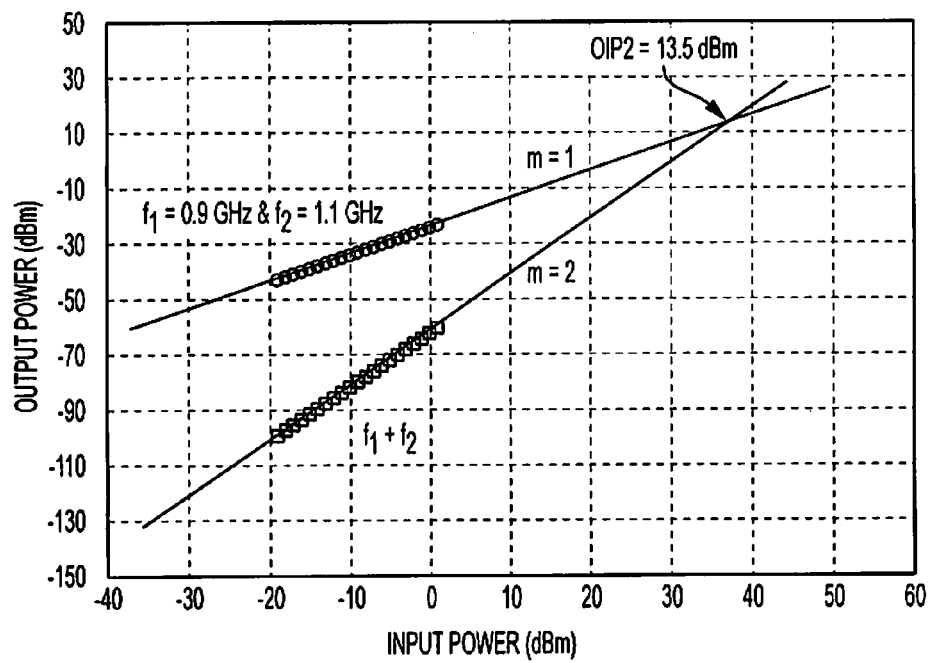
FIG. 3 is a graph of the measured OIP2 due to intermodulation distortion for the photodiode at 3 mA average photocurrent showing the measured fundamentals (circles), the measured IMD2 (squares), and the first- and second-order fits with slopes m=1 and m=2, respectively.

The structure shown in FIG. 2 was constructed using two 100-mW semiconductor lasers (EM4, Inc.) at 1548 nm and 1560 nm. The two MZMs (EOSPACE) exhibited 20 GHz of analog bandwidth and had nearly equal $V_\pi(\Omega)$. The two signal generators were set at $f_1=0.9$ GHz and $f_2=1.1$ GHz. With the variable optical attenuators set to output the same average optical power, the signal generators were tuned to establish the same modulation depth on each laser. The photodiode being examined was an Applied Optoelectronics PD3000 with about a 3-GHz 3-dB bandwidth. The photodiode was reversed biased with 1 V and the OIP2 was measured by sweeping the input power at $f_1$ and $f_2$. The measured OIP2=13.5 dBm due to IMD2 at 2.0 GHz for an average photocurrent of $I_{dc}=3.0$ mA as shown in FIG. 3. Also measured were OIP2=13.8 and 13.5 dBm at $I_{dc}=2.5$ and 3.5 mA, respectively.

The same photodiode was used in a link such as shown in FIG. 1. An 80-mW semiconductor laser near 1550 nm (EM4, Inc.) was used as the source at the input to a dual-output 20-GHz MZM (EOSPACE) with $V_\pi=4.5$ V at 1 GHz. One output of the MZM was fed to an optical power meter to monitor the bias, while the other was attenuated and connected to the photodiode. The quadrature photocurrent was set at $I_{dc,q}=3.0$ mA. A network analyzer was employed to measure the single-tone small-signal gain with an input power of −20 dBm. The response was 4-dB less than that predicted by Eq. (3) with R=50Ω at 1 GHz. With this result, Eq. (8) allows for $a_1=0.631$ to be calculated. Equation (10) can then be solved for $a_2=13.3$ A$^{-1}$.

Figure 4:
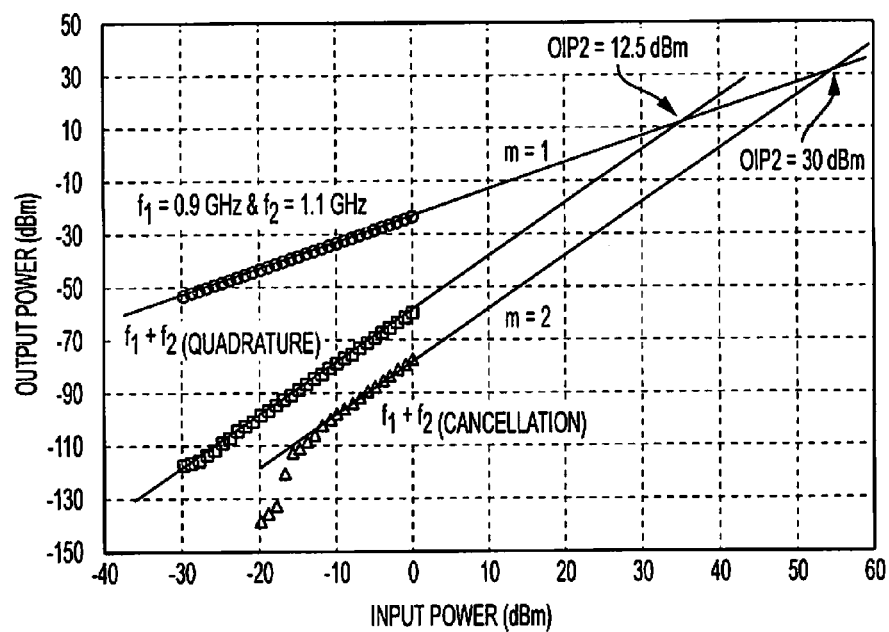
FIG. 4 is a graph of the measured OIP2s for the link at quadrature and at the cancellation point showing the measured fundamentals (circles), the measured IMD2 at quadrature (squares), the measured IMD2 at the cancellation condition (triangles), and the first and second order fits with slopes m=1 and m=2, respectively, according to the invention.
Figure 5:
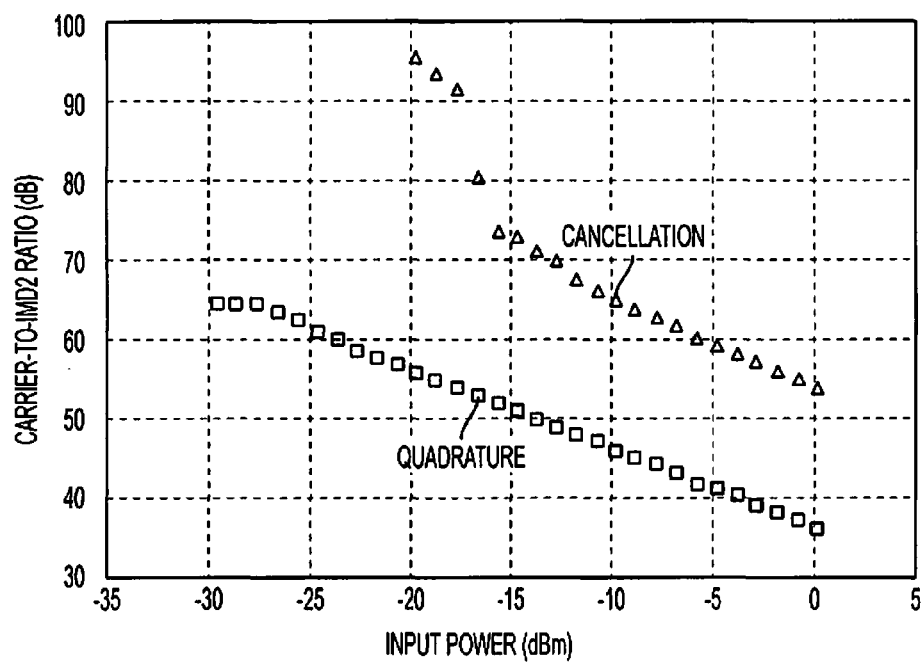
FIG. 5 is a graph of the CIR at quadrature (squares) and at the cancellation condition (triangles) for the data in FIG. 4, according to the invention.

A two-tone test was applied to the link with frequencies $f_1=0.9$ GHz and $f_2=1.1$ GHz, the results of which are shown in FIG. 4. The fundamentals both exhibit the same gain. The IMD2 at 2.0 GHz resulted in an OIP2=12.5 dBm when the MZM was biased at quadrature. This level is very close to that measured for the photodiode alone with the setup in FIG. 2, indicating that the photodiode is limiting the IMD2. The MZM bias was adjusted to determine the minimum IMD2, which was observed well away from quadrature at an average photocurrent of 2.5 mA. The IMD2 at this cancellation point is also plotted in FIG. 4. Very strong suppression was measured at input powers below −15 dBm; the suppression is good but much less at higher input powers. A second-order function is fit to the data at higher input powers resulting in OIP2=30 dBm. This limiting OIP2 is attributed to reflections in the apparatus but is still 16.5 dB better than the OIP2 of the photodiode. As opposed to other linearization techniques, the fundamental is not affected by this method. The carrier-to-intermodulation ratio (CIR) is plotted in FIG. 5 to demonstrate this point. At high input powers, the CIR is 17.5 dB higher at 2.5 mA than that at 3.0 mA (MZM quadrature). In the strong cancellation region, the CIR difference is upwards of 40 dB.

Figure 6:
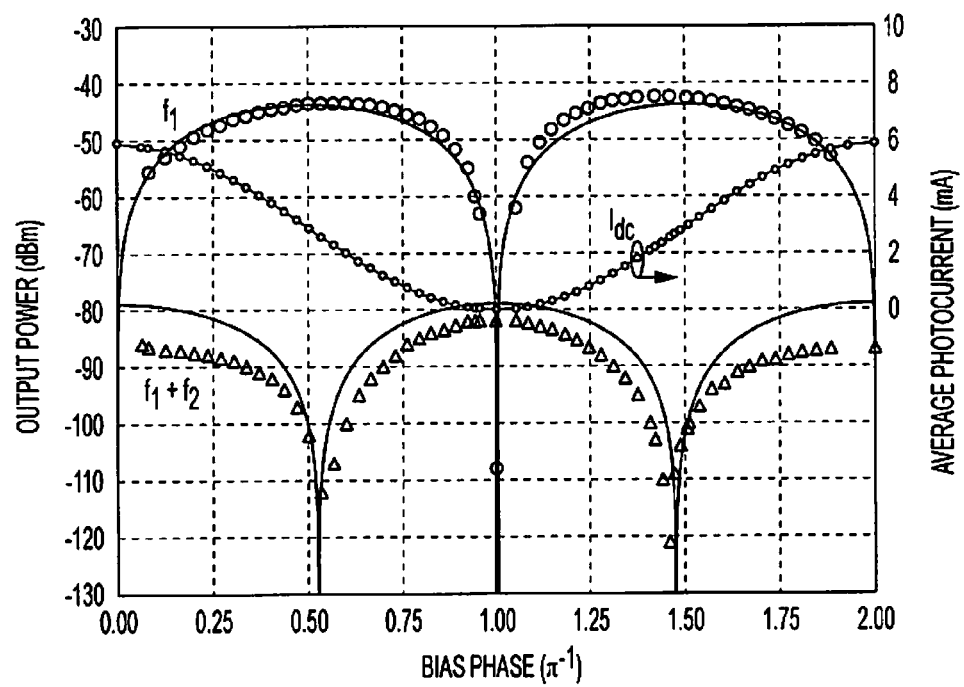
FIG. 6 is a graph of the measured fundamental output power (open circles), measured IMD2 (triangles) and measured DC photocurrent (gray circles) as a function of MZM bias for the link at −20 dBm input power to the fundamentals, and where the solid lines show the calculated fundamental power, IMD2 power and average photocurrent, according to the invention.

To confirm the cancellation condition, equations were plotted with measured data as a function of $\phi_{dc}$. As shown in FIG. 6, the calculated fundamental power [Eq. 8], the IMD2 power [Eq. (11)] and the DC photocurrent [Eq. (2a)] follow the experimental results. The measured and calculated DC photocurrents agree precisely. The calculated and experimental fundamental powers agree well at quadrature ($I_{dc,q}=3.0$ mA). However, the measured values diverge above the calculation below 3.0 mA and go below the calculation photocurrents above 3.0 mA. The IMD2 curves follow the same trend with a larger divergence but do agree quite well at the cancellation condition. The reason for the divergences is attributed to photodiode compression, which is worse at higher photocurrents and at higher frequencies. The three measured OIP2 values using the setup in FIG. 2 also support this attribution.

With this caveat, the measured results very much support the theory in predicting the cancellation of photodiode IMD2 with MZM-generated IMD2.

Figure 7:
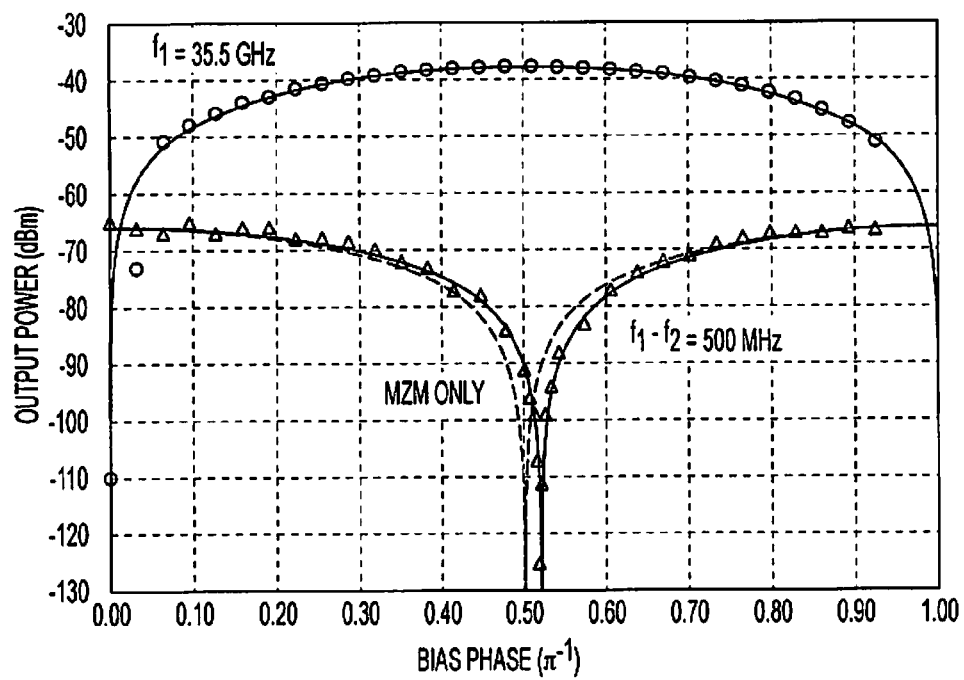
FIG. 7 is a graph of the measured fundamental output power (open circles) and measured IMD2 (triangles) as a function of MZM bias for the link at −20 dB input power to the fundamentals, where the solid lines show the calculated fundamental power and IMD2 power, and the gray dotted line shows the calculator IMD2 with MZM only, according to the invention.

To demonstrate the utility at high frequencies and under conditions where the photodiode is uncompressed, a second device was measured. A u$^2$t Photonics (Model: u$^2$t S/N 46167) commercial device was measured as above biased at 3V with $I_{dc,q}=2.5$ mA, at center frequency 35.5 GHz with 500 MHz separation. Shown in FIG. 7, the calculated fundamental power [Eq. 8] and IMD2 power [Eq. 11] precisely agree with the experimental result over the bias conditions, as the uncompressed diode behaves according to the theoretical assumption. The calculated MZM generated IMD2 (gray dotted line) is also plotted to distinguish between the measured results and what would be obtained with an ideal linear photodiode.

Figure 8:
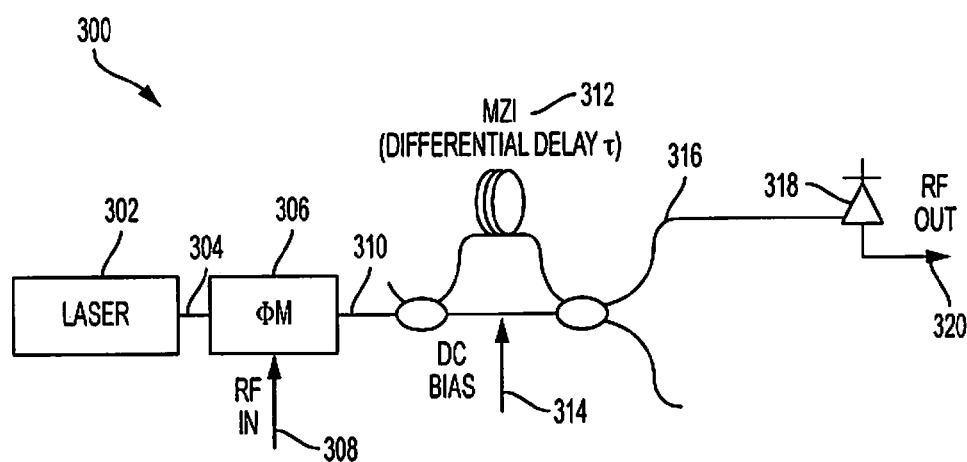
FIG. 8 is a schematic diagram of a phase-modulation direct-detection link employing an external phase modulator and Mach-Zehnder interferometer (MZI) according to the invention.
Figure 9:
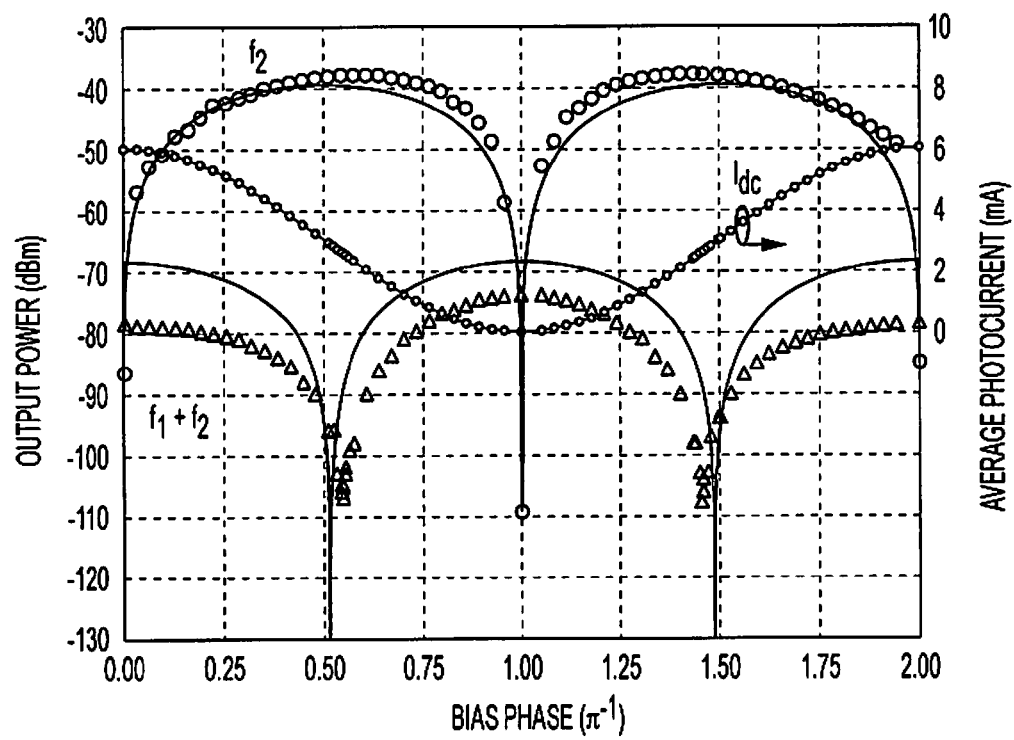
FIG. 9 is a graph of the measured fundamental output power (open circles), measured IMD2 (triangles) and measured DC photocurrent (gray circles) as a function of MZM bias for the link in FIG. 8 at −25 dBm input power to the fundamentals, where the solid lines show the calculated fundamental power, IMD2 power and average photocurrent, according to the invention.

A phase- or polarization-modulation link can be employed to cancel photodiode even-order distortion in much the same way as the IMDD link. A similar theoretical treatment can be applied to the phase- or polarization-modulation architecture. The phase-modulation link 300 is shown in FIG. 8. A laser 302 outputs a laser light 304 to a phase modulator 306 having an RF signal input 308 and an output connected to a Mach-Zehnder interferometer (MZI) 312. MZI 312 has an input 314 connected to a DC voltage source for applying an adjustable DC bias voltage to MZI 312 where the bias is adjusted on the MZI to achieve the distortion cancellation, and an optical signal output 316 that is input to a photodiode 318, producing RF output signal 320. In contrast to the IMDD link, the phase-modulation link allows for precise bias control of the MZI in a point-to-point link at the receiver end, with the trade-off of the additional difficulty in stabilizing the MZI. A preliminary result is plotted in FIG. 9, similar to FIGS. 6 and 7. For the link measured, the MZI had a 375 ps differential delay. The same PD300 was measured under the same conditions, 1 V bias and $I_{dc,q}=3.0$ mA where the photodiode is compressed. The calculated fundamental power, the IMD2 power and the DC photocurrent power again match well at quadrature but similar to FIG. 6 are not in good agreement at the cancellation condition due to the photodiode compression. However the general trend is followed for both the measurement and theoretical analysis.

Figure 10:
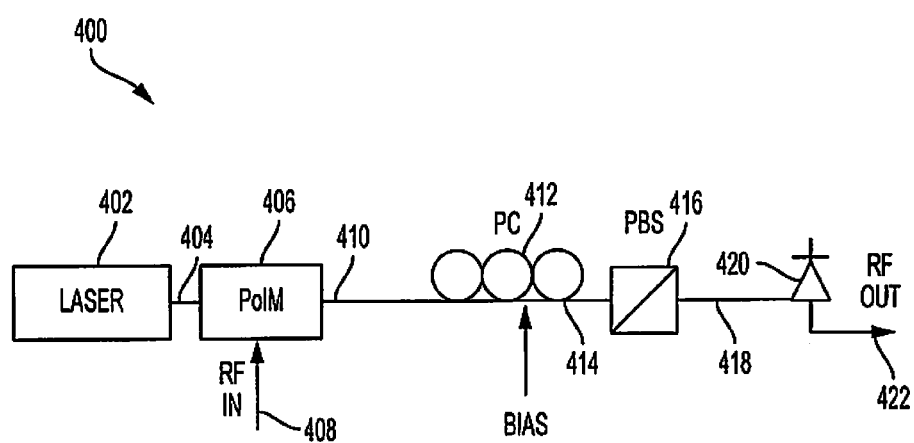
FIG. 10 is a schematic diagram of a phase modulation link employing a laser, polarization modulator with a beam splitter biased by a polarization controller with direct detection by a photodiode according to the invention.

The polarization-modulation link architecture 400 is shown in FIG. 10. A laser 402 provides a laser light input 404 to a polarization modulator 406 with an RF input 408 and an output 410 where the modulation axis is adjusted by a polarization controller 412 and acts as the DC bias control with its output 414 input to a beam splitter 416, with an output 418 that is input to a photodiode 420, producing an RF output signal 422. The theoretical analysis for the architecture follows the same method as previously.

Obviously many modifications and variations of the present invention are possible in the light of the above teachings. It is therefore to be understood that the scope of the invention should be determined by referring to the following appended claims.

What is claimed as new and desired to be protected by Letters Patent of the United States is:

1. A system for suppressing even-order distortion in a photonic link, comprising:
   a laser light source for generating a laser light output;
   a Mach-Zehnder modulator (MZM) having a first input coupled to the laser light output, a second input for receiving an RF input signal, a third input for applying a DC bias voltage to the MZM, and an optical signal output, and a dc-voltage-biased photodiode having an input coupled to the optical signal output and a modulated RF signal output, and where the MZM DC bias voltage is set at a value away from a quadrature point such that an even-order distortion amplitude generated by the MZM due to an MZM transfer function combined with a photodiode response given by $$\frac{\cos(\phi_{dc})}{\sin^2(\phi_{dc})} = -2a_2 I_{dc,q}$$

where $\phi_{dc}=\pi V_{dc}/V_{\pi,dc}$-$a_2$ is second order Taylor series coefficient of the photodiode, $V_{dc}$ is the DC voltage applied to the input of the MZM, $V_{\pi,dc}$ is the DC half-wave voltage of the MZM, and $I_{dc,q}$ is the DC photocurrent at the quadrature point is equal to an even-order distortion amplitude from the photodiode and 180 degrees out of phase so as to cancel the photodiode even-order distortion.

2. A system for suppressing even-order distortion in a photonic link, comprising:
a laser light source for generating a laser light output;
a phase modulator (PM) having a first input coupled to the laser light output, a second input for receiving an RF signal, and an output;
a Mach-Zehnder interferometer (MZI) having a first input coupled to the PM output, a second input coupled to a DC bias voltage source, and an output; and
a photodiode coupled to the MZI output,
and where the DC bias voltage is set at a value away from a quadrature point such that an even-order distortion amplitude due to the transfer function of the PM and MZI combined with a photodiode response given by $$\frac{\cos(\phi_{dc})}{\sin^2(\phi_{dc})} = -2a_2 I_{dc,q},$$

where $\phi_{dc}=\chi\tau$ where $\tau$ is the differential time delay in the MZI, $a_2$ is second order Taylor series coefficient of the photodiode, $\omega$ is the angular frequency, and $I_{dc,q}$ is the DC photocurrent at the quadrature point is equal to an even-order distortion amplitude from the photodiode and 180 degrees out of phase so as to cancel the photodiode even-order distortion.

3. A system for suppressing even-order distortion in a photonic link, comprising:
a laser light source for generating a laser light output;
a polarization modulator (PolM) having a first input coupled to the laser light output, a second input for receiving an RF signal, and an output;
a polarization controller having an input coupled to the PolM output and an output;
a beam splitter having an input coupled to the polarization controller output and an output; and
a photodiode having an input coupled to the beam splitter and an RF signal output, and where a modulation axis of the beam splitter is adjusted by the polarization controller to thereby operate as a bias point control where the polarization controller is adjusted away from a quadrature point such that an even-order distortion amplitude generated by the PolM and the polarization controller combined with a photodiode response given by $$\frac{\cos(\phi_{dc})}{\sin^2(\phi_{dc})} = -2a_2 I_{dc,q},$$

where $\phi_{dc}=\phi_{PolM}+\phi$ where $a_2$ is second order Taylor series coefficient of the photodiode, $\phi_{PolM}$ is the DC voltage applied to the input of the PolM, $\phi$ is the angle of the polarization controller with respect to the beam splitter, and $I_{dc,q}$ is the DC photocurrent at the quadrature point is equal to an even-order distortion amplitude from the photodiode and 180 degrees out of phase so as to cancel the photodiode even-order distortion.

4. A system for suppressing even-order distortion in a photonic link, comprising:
a laser light source for generating a laser light output;
a modulator having a first input coupled to the laser light output, a second input for receiving an RF signal, and an output;
optical biasing means for generating a bias having an input coupled to the output of the modulator and an output; and
a photodiode coupled to the output of the optical biasing means and where a combined general transfer function has the relationship $$\frac{\cos(\phi_{dc})}{\sin^2(\phi_{dc})} = -2a_2 I_{dc,q}$$

where $\phi dc=\pi Vdc/V_{\pi dc}$-$a_2$ is second order Taylor series coefficient of the photo diode, $V_{dc}$ is the DC voltage applied to the input of the MZM, $V_{\pi dc}$ is the DC half-wave voltage of the MZM, and $I_{dc,q}$ is the DC photocurrent at the quadrature, and the controlling bias point is adjusted away from a quadrature point such that an even-order distortion amplitude generated by the modulator and the optical biasing means combined with the photodiode response is equal to an even-order distortion amplitude from the photodiode and 180 degrees out of phase so as to cancel the photodiode even-order distortion.

* * * * *